US010228966B2

(12) United States Patent
Pachlore et al.

(10) Patent No.: US 10,228,966 B2
(45) Date of Patent: Mar. 12, 2019

(54) METHODS AD SYSTEMS FOR HIBERNATION OF PROCESSES IN COMPUTING DEVICES

(71) Applicants: Mohanish Chandrapalsingh Pachlore, Maharashtra (IN); Yin Tan, Waterloo (CA); Dongjin Kim, Waterloo (CA)

(72) Inventors: Mohanish Chandrapalsingh Pachlore, Maharashtra (IN); Yin Tan, Waterloo (CA); Dongjin Kim, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 15/423,943

(22) Filed: Feb. 3, 2017

(65) Prior Publication Data

US 2018/0225142 A1    Aug. 9, 2018

(51) Int. Cl.
*G06F 9/46* (2006.01)
*G06F 9/4401* (2018.01)

(52) U.S. Cl.
CPC ............ *G06F 9/461* (2013.01); *G06F 9/4418* (2013.01)

(58) Field of Classification Search
None
See application file for complete search history.

(56) References Cited

U.S. PATENT DOCUMENTS

| 8,504,001 | B2* | 8/2013 | Van Os ................. G06Q 10/00 345/1.2 |
| 2005/0054372 | A1 | 3/2005 | Tsuda et al. |
| 2007/0250730 | A1* | 10/2007 | Reece ................... G06F 1/3203 713/323 |
| 2011/0016417 | A1 | 1/2011 | Shiplacoff et al. |
| 2011/0093956 | A1* | 4/2011 | Laarakkers ......... H04L 63/1458 726/25 |
| 2013/0182615 | A1* | 7/2013 | Sun ................... H04W 52/0219 370/255 |
| 2014/0200860 | A1 | 7/2014 | Jun et al. |
| 2015/0186151 | A1 | 7/2015 | Shen et al. |

FOREIGN PATENT DOCUMENTS

| CN | 1801096 A | 7/2006 |
| CN | 103927196 A | 7/2014 |
| CN | 104750227 A | 7/2015 |
| WO | 03049412 A1 | 6/2003 |

* cited by examiner

*Primary Examiner* — Gregory A Kessler
(74) *Attorney, Agent, or Firm* — Norton Rose Fulbright Canada LLP (57) ABSTRACT

The present disclosure is drawn to methods and systems for the management of computing devices. Unnecessary and/or idle processes in a primary memory are hibernated. Hibernation is performed by displacing the processes to a secondary memory. Hibernated processes are resumed when needed. The device is still operational while the processes are in hibernation.

21 Claims, 13 Drawing Sheets

METHODS AD SYSTEMS FOR HIBERNATION OF PROCESSES IN COMPUTING DEVICES

TECHNICAL FIELD

The present disclosure relates to computing devices and more particularly, to techniques for managing processes in computing devices.

BACKGROUND OF THE ART

Designers of computing devices, such as mobile phones, laptop computers, desktop computers, and tablets are constantly asked to make devices with large amounts of memory. However, more memory leads to increased size, weight, and costs for the consumer. With the ever-increasing number of applications and processes that run on computing devices, providing sufficient memory while meeting other design criteria is especially challenging.

SUMMARY

The present disclosure is drawn to methods and systems for the management of computing devices. Unnecessary and/or idle processes in a primary memory are hibernated. Hibernation is performed by displacing the processes to a secondary memory. Hibernated processes are resumed when needed. The device is still operational while the processes are in hibernation.

In accordance with a broad aspect, there is provided a method for managing a computing device. The method comprises receiving a command to hibernate at least one process in a primary memory, the at least one process associated with a computer program on the computing device, hibernating the at least one process to a secondary memory, the computing device remaining operable during hibernation of the at least one process, and resuming the at least one process in response to a command to resume the at least one process.

In accordance with another aspect, there is provided a system for managing a computing device. The system comprises at least one processing unit and a non-transitory memory communicatively coupled to the at least one processing unit and comprising computer-readable program instructions. The instructions are executable by the at least one processing unit for receiving a command to hibernate at least one process in a primary memory, the at least one process associated with a computer program on the computing device, hibernating the at least one process to a secondary memory, the computing device remaining operable during hibernation of the at least one process, and resuming the at least one process in response to a command to resume the at least one process.

In any of the previous embodiments, hibernating the at least one process comprises capturing at least one image of the at least one process and storing the at least one image in the secondary memory.

In any of the previous embodiments, resuming the at least one process comprises retrieving the at least one image from the secondary memory; reloading the at least one image; and restoring the at least one process using the at least one image.

In any of the previous embodiments, hibernating the at least one process comprises compressing the at least one image and storing the at least one image as compressed in the secondary memory.

In any of the previous embodiments, hibernating the at least one process comprises encrypting the at least one image and storing the at least one image as encrypted in the secondary memory.

In any of the previous embodiments, receiving the command to hibernate comprises receiving the command from a server remote to the computing device.

In any of the previous embodiments, the computing device comprises a plurality of containers, wherein the at least one process is associated with one of the plurality of containers, and wherein the one of the plurality of containers is inactive.

In any of the previous embodiments, the computing device comprises a plurality of operating systems, wherein the at least one process is associated with one of the plurality of operating systems, and wherein the one of the plurality of operating systems is inactive.

In any of the previous embodiments, the computing device comprises a plurality of user accounts, wherein the at least one process is associated with one of the plurality of user accounts, and wherein the one of the plurality of user accounts is inactive.

In any of the previous embodiments, the primary memory is a volatile memory and the secondary memory is a non-volatile memory.

In accordance with yet another aspect, there is provided a computing device comprising a primary memory having stored thereon at least one computer program and one or more processes associated with the at least one computer program, a secondary memory, and a process manager. The process manager is configured for receiving a command to hibernate at least one of the one or more processes in the primary memory, hibernating the at least one of the one or more processes to the secondary memory, the computing device remaining operable during hibernation, and resuming the at least one of the one or more processes in response to a command to resume the at least one of the one or more processes.

In any of the previous embodiments, the computing device is a mobile device.

In any of the previous embodiments, the computing device comprises a plurality of containers, the at least one process is associated with one of the plurality of containers, and the one of the plurality of containers is inactive.

In any of the previous embodiments, the computing device comprises a plurality of operating systems, the at least one process is associated with one of the plurality of operating systems, and the one of the plurality of operating systems is inactive.

In any of the previous embodiments, the computing device comprises a plurality of user accounts, the at least one process is associated with one of the plurality of user accounts, and the one of the plurality of user accounts is inactive.

In any of the previous embodiments, the primary memory is a volatile memory and the secondary memory is a non-volatile memory.

BRIEF DESCRIPTION OF THE DRAWINGS

Further features and advantages of the present invention will become apparent from the following detailed description, taken in combination with the appended drawings, in which.

Throughout the appended drawings, like features are identified by like reference numerals.

DETAILED DESCRIPTION

Figure 1A:
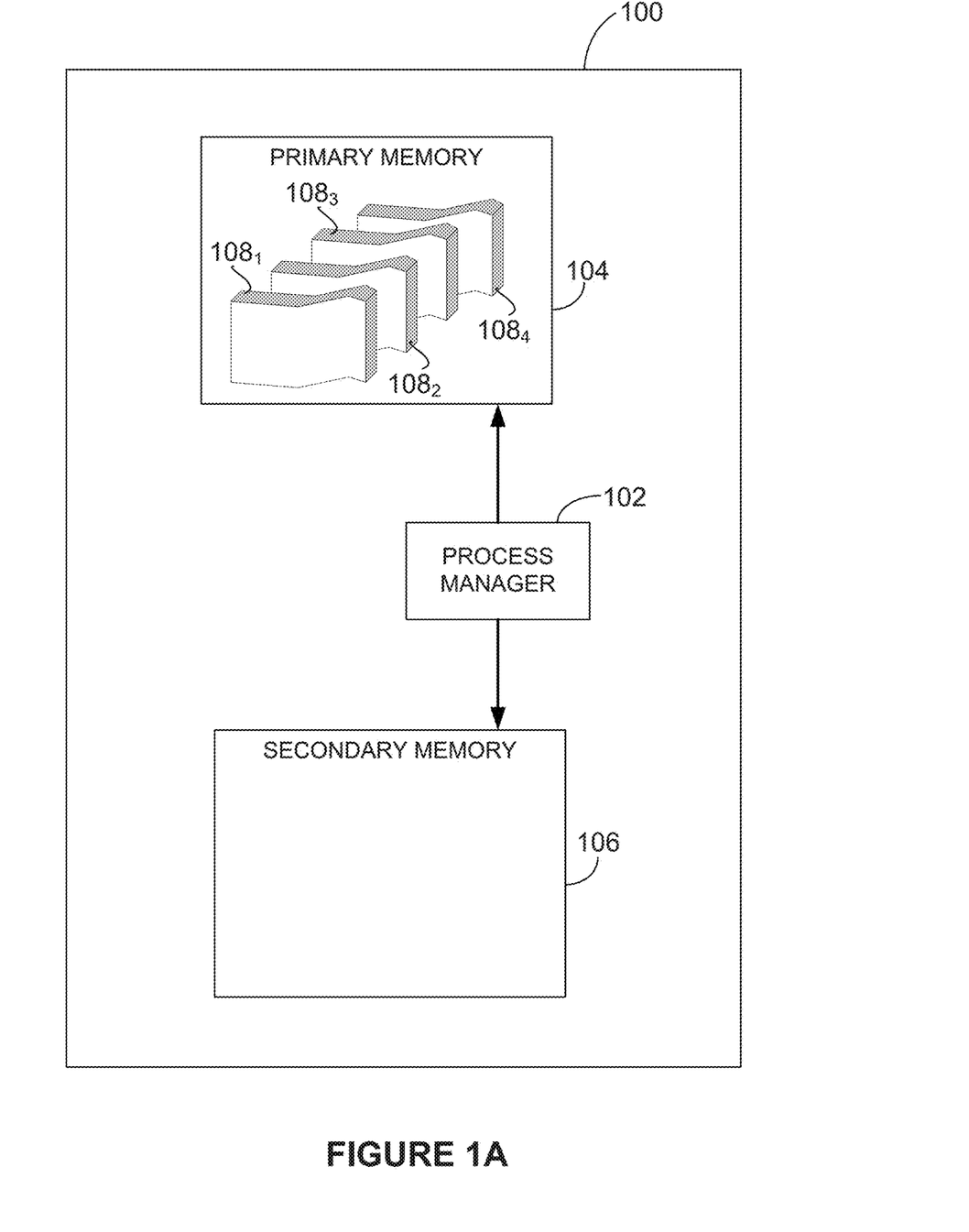
FIG. 1A is a schematic diagram of an example embodiment of a computing device.

Referring to FIG. 1A, there is illustrated an example computing device 100, which may be a desktop computer, laptop computer, tablet, phablet, smartphone, personal digital assistant, any other suitable mobile device, and the like. A process manager 102 is operatively connected to at least one primary memory 104 and at least one secondary memory 106. The primary memory 104 is, for example, a random-access memory (RAM), such as a dynamic RAM (DRAM), a double data rate synchronous DRAM (DDR SDRAM), a static RAM (SRAM), a thyristor RAM (T-RAM), a zero-capacitor RAM (Z-RAM) and the like. In other embodiments, the primary memory 104 is any one of flash memory, solid state storage, 3D XPoint, a hard disk drive, an optical disk drive, or any other suitable storage media or device. The secondary memory 106 is, for example, an embedded memory or a memory card. In other embodiments, the secondary memory is any other type of volatile or non-volatile storage device having reading and writing capabilities.

One or more process $108_1$, $108_2$, $108_3$, $108_4$ (collectively referred to as 108) are stored in the primary memory 104. Each process 108 is an instance of a computer program running in the computing device 100. A computer program is a passive collection of instructions. A process is the execution of the instructions when the computer program is initiated. One or more process may be associated with a same computer program.

Figure 1B:
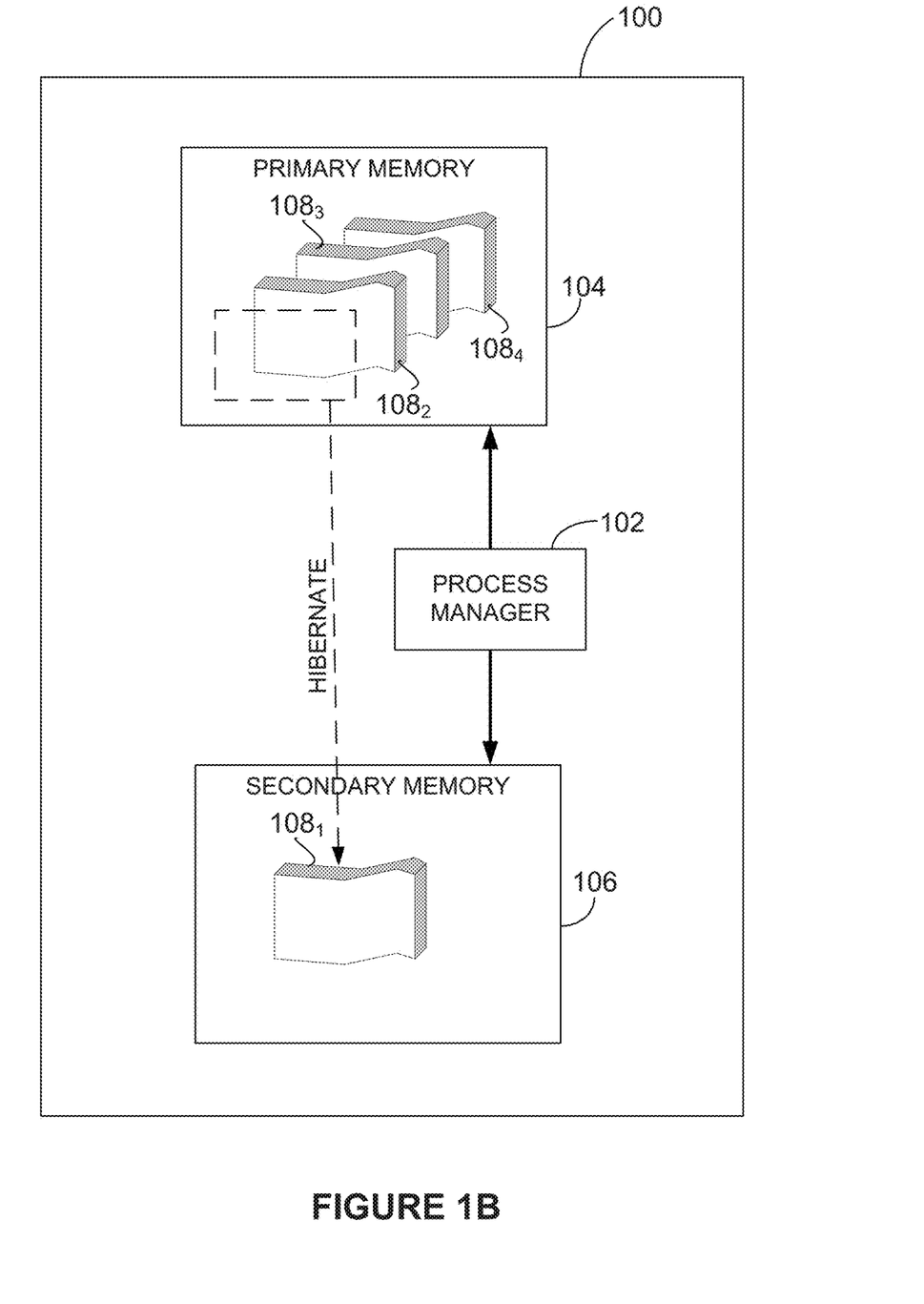
FIG. 1B illustrates the computing device of FIG. 1A with a first hibernated process.

Unnecessary and/or idle processes 108 in primary memory 104 are hibernated to the secondary memory 106 by the process manager 102. Process hibernation refers to the suspension of a process while retaining its state by displacing information regarding the state of the process from a volatile memory to a non-volatile memory. Upon hibernation, the context of the process in primary memory 104 is saved to the secondary memory 106. Process hibernation differs from computer hibernation in that only the targeted process is hibernated instead of the entire contents of a volatile memory, and the device is not powered down. Process hibernation also differs from sleep mode, where a small amount of power is used to preserve the contents of the volatile memory in order to save battery power. Process hibernation may improve performance of device 100 in terms of battery life, speed, and/or memory usage. In FIG. 1B, process $108_1$ is displaced from primary memory 104 to secondary memory 106 by process manager 102. Unlike in sleep mode and in device hibernation, device 100 remains operable during hibernation of process $108_1$. In other words, the device 100 may still be operated as other processes running in the primary memory 104 are accessible.

Figure 1C:
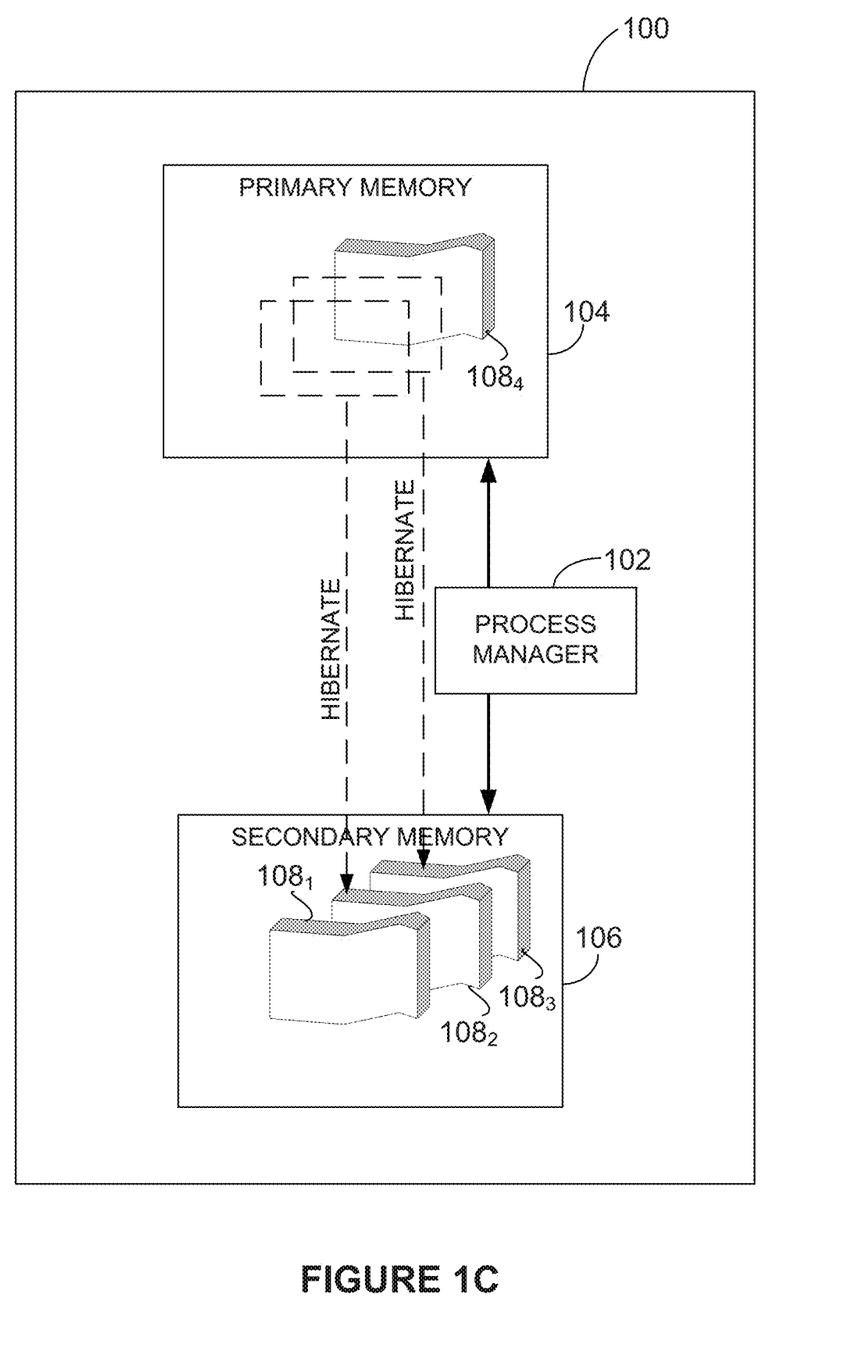
FIG. 1C illustrates the computing device of FIG. 1A with a second and third hibernated process.

In some embodiments, more than one process 108 is hibernated at any one time. For example, in FIG. 1C, processes $108_2$ and $108_3$ are displaced together from primary memory 104 to secondary memory 106 by process manager 102. Note that process $108_1$ is still in hibernation in the secondary memory 106 when processes $108_2$ and $108_3$ are hibernated.

Figure 1D:
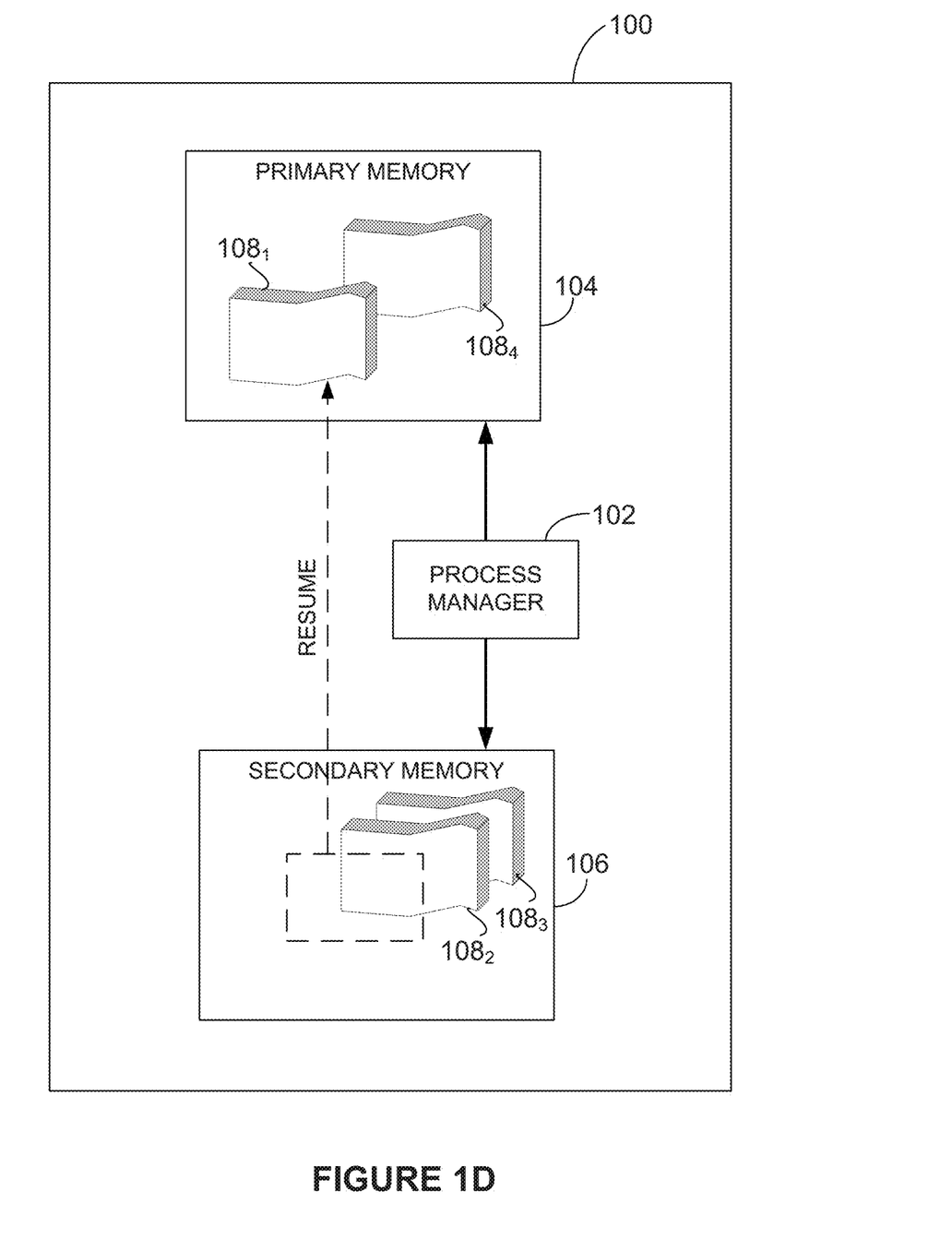
FIG. 1D illustrates the computing device of FIG. 1A with a first resumed process.

In FIG. 1D, process $108_1$ is resumed by displacing process $108_1$ from the secondary memory 106 to the primary memory 104. The order in which the hibernated processes are restored is independent of the order in which they are hibernated. For example, process $108_2$ and/or process $108_3$ may be resumed before process $108_1$, even though process $108_1$ was hibernated before processes $108_2$ and $108_3$. In addition, although processes $108_2$ and $108_3$ were hibernated together, one of the two may be resumed while the other one remains in hibernation. The needs of the computing device 100, and more specifically the computer programs run by the computing device 100, will dictate which ones of the hibernated processes are resumed.

Figure 2:
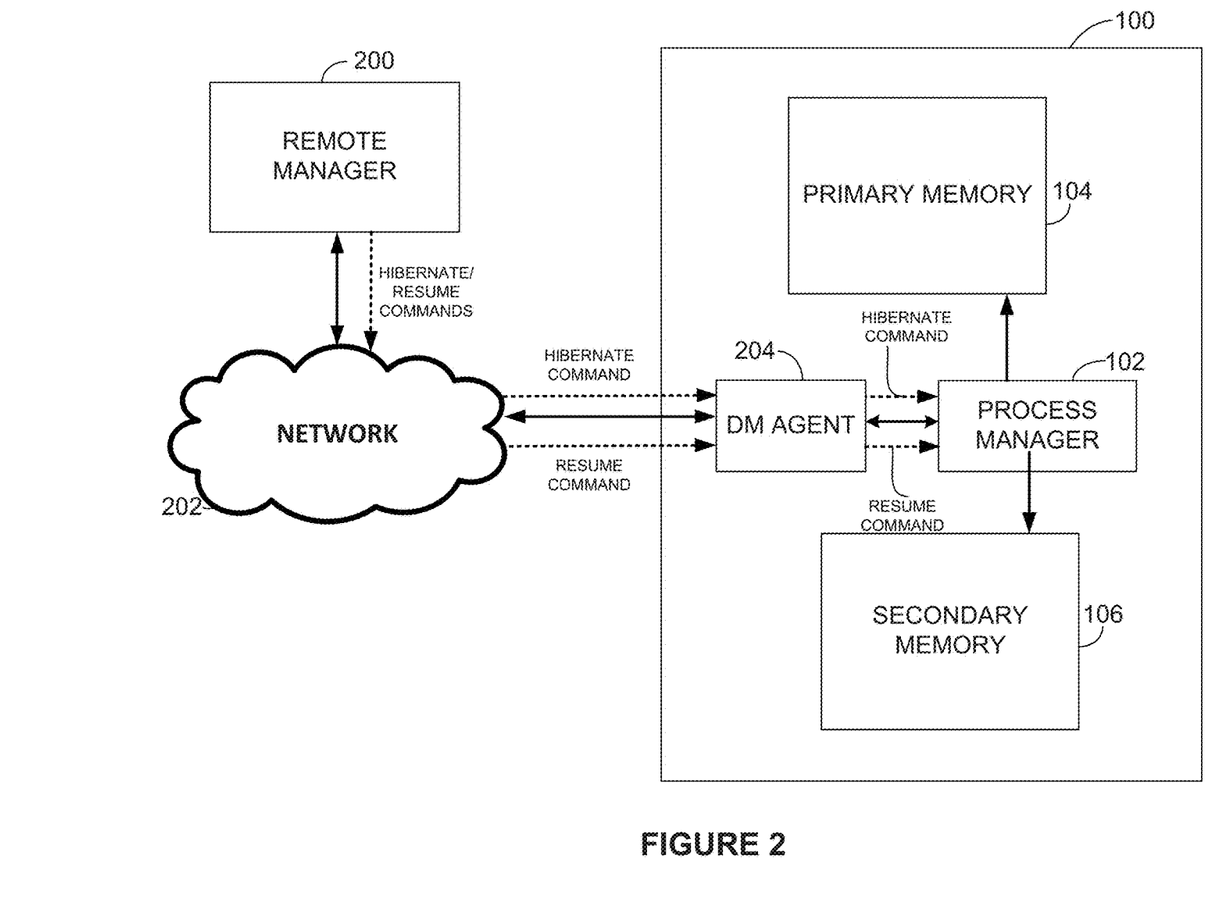
FIG. 2 is a schematic diagram of the computing device of FIG. 1A remotely accessed for process hibernation.

Process hibernation is performed in response to a command to hibernate at least one process in the primary memory 104. In some embodiments, the hibernate command is issued from within the computing device 100, for example from an operating system (not shown) of the device 100 to the process manager 102. In some embodiments, the hibernate command is received by the process manager 102 from a remote manager 200, located outside of the computing device 100, as illustrated in FIG. 2. The hibernate command is transmitted to the device 100 via a network 202. In some embodiments, the remote manager is a device management (DM) server, used for the administration of devices such as smartphones, tablets, laptops, and desktop computers. The hibernate command is received by a DM agent 204 located on the device 100 before being transmitted to the process manager 102.

Process resumption is performed in response to a command to resume at least one process. The resume command is issued from within the computing device 100 or from a remote manager 200 located outside of the computing device 100. In the example of FIG. 2, the resume command is transmitted to the device 100 via the network 202, and received by the DM agent 204 before being transmitted to the process manager 102.

When the device 100 is a corporate device that functions within a "bring your own device" (BYOD) or "corporate owned, personally enabled" (COPE) policy, process hibernation allows a device administrator to perform remote debugging and/or upgrading of software without having to remove the software from the device 100. Processes that are hibernating in secondary memory 106 may be accessed by the administrator as desired. Process hibernation may be especially useful off work-hours, when work-related processes may be hibernated and accessed by a system administrator without affecting the user's ability to operate the device for personal use. Process hibernation may also be used for cloud services. An internal cloud service provider may manage/control the devices and resources through hibernating of unused processes.

The network 202 is capable of carrying data and can involve wired connections, wireless connections, or a combination thereof. The network 202 may involve different network communication technologies, standards and protocols, for example Global System for Mobile Communications (GSM), Code division multiple access (CDMA), wireless local loop, WiMAX, Wi-Fi, Bluetooth, Long Term Evolution (LTE) and so on. The network 202 may involve different physical media, for example coaxial cable, fiber optics, transceiver stations and so on. Example network types include the Internet, Ethernet, plain old telephone service (POTS) line, public switched telephone network (PSTN), integrated services digital network (ISDN), digital subscriber line (DSL), and others, including any combination of these. The network 202 can include a local area network and/or a wide area network.

Figure 3A:
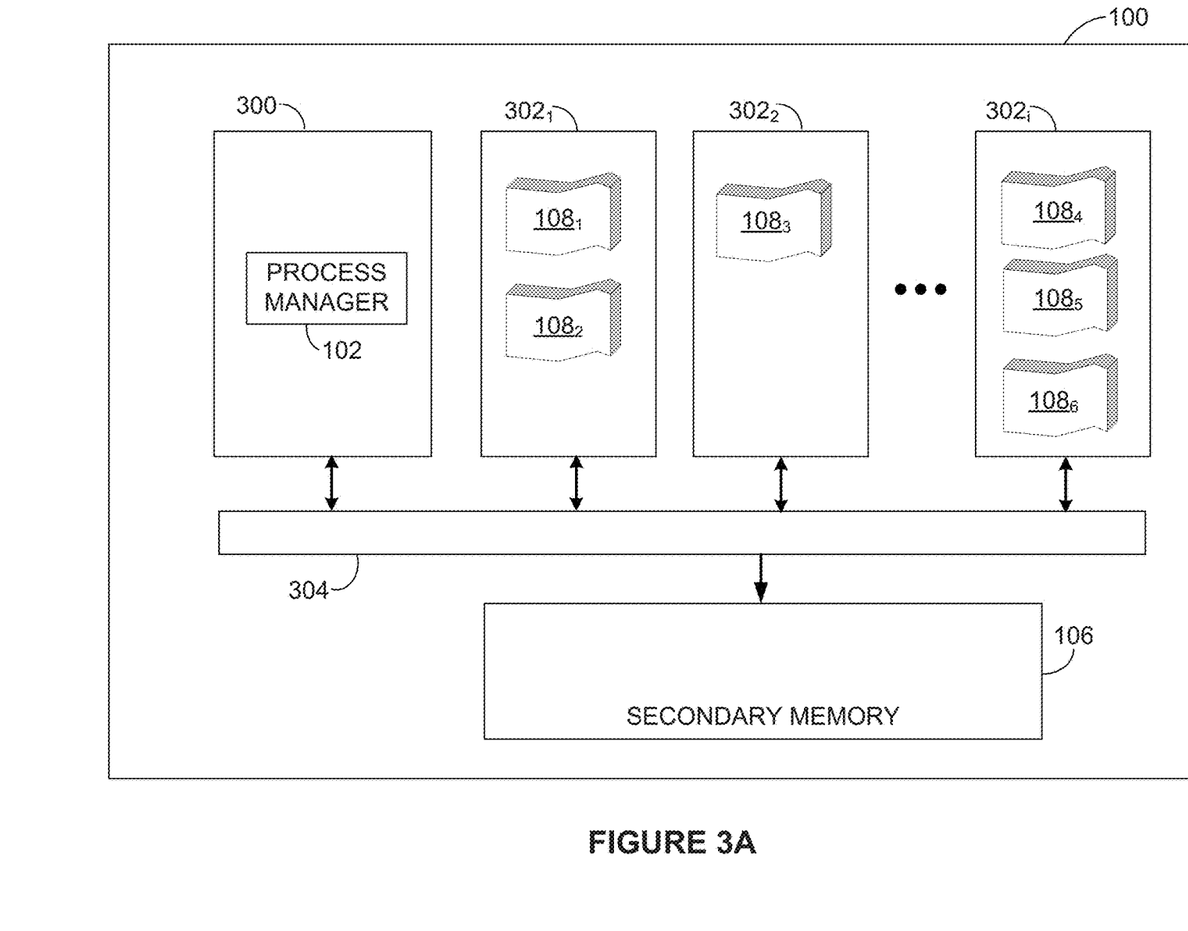
FIG. 3A is a schematic diagram of an example embodiment of a computing device with multiple virtual containers.

Turning now to FIG. 3A, there is illustrated another embodiment of computing device 100. An operating system kernel 304 implements a root container 300. The root container 300 is configured for running the process manager 102. The root container 300 is also configured to instantiate and run additional containers $302_1$, $302_2$, ..., $302_i$. Container $302_1$ is configured for running processes $108_1$, $108_2$, container $302_2$ is configured for running process $108_3$, and container $302_i$ is configured for running processes $108_4$, $108_5$, and $108_6$.

Figure 3B:
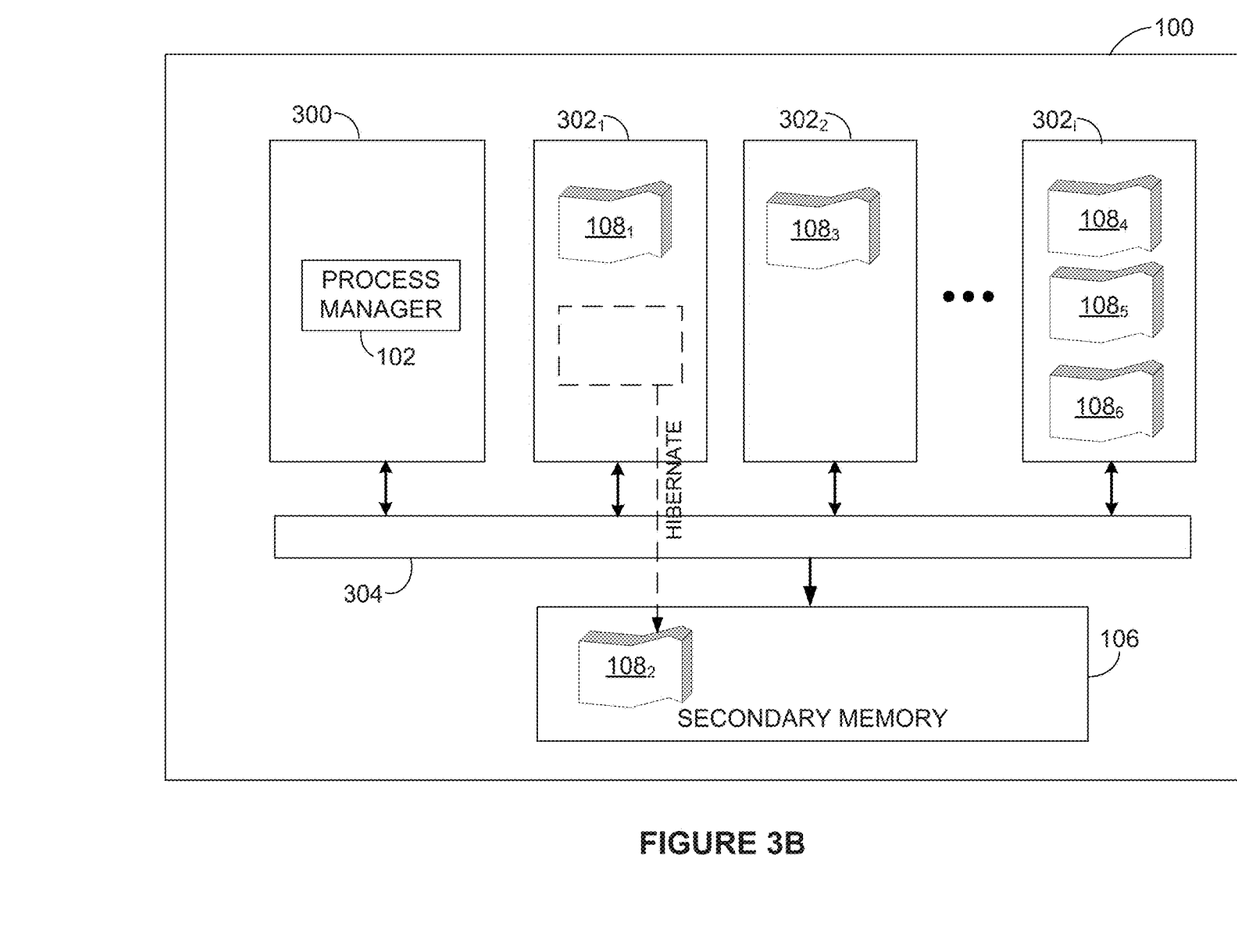
FIG. 3B is a schematic diagram of the computing device of FIG. 3A with a hibernated process.

At FIG. 3B, the process manager 102 has, in response to a command to hibernate process $108_2$, displaced process $108_2$ to secondary memory 106. The computing device 100 remains operable during hibernation of process $108_2$. Indeed, processes $108_1$ and $108_3$ to $108_6$ are all active in their respective containers. In some embodiments, one of containers $302_1$, $302_2$, ..., $302_i$ is inactive and all processes associated with the inactive container are hibernated. For example, processes $108_1$ and $108_2$ are hibernated to secondary memory 106 when container $302_1$ is inactive, process $108_3$ is hibernated to secondary memory 106 when container $302_2$ is inactive, and processes $108_4$, $108_5$, $108_6$ are hibernated to secondary memory 106 when container $302_i$ is inactive.

Figure 3C:
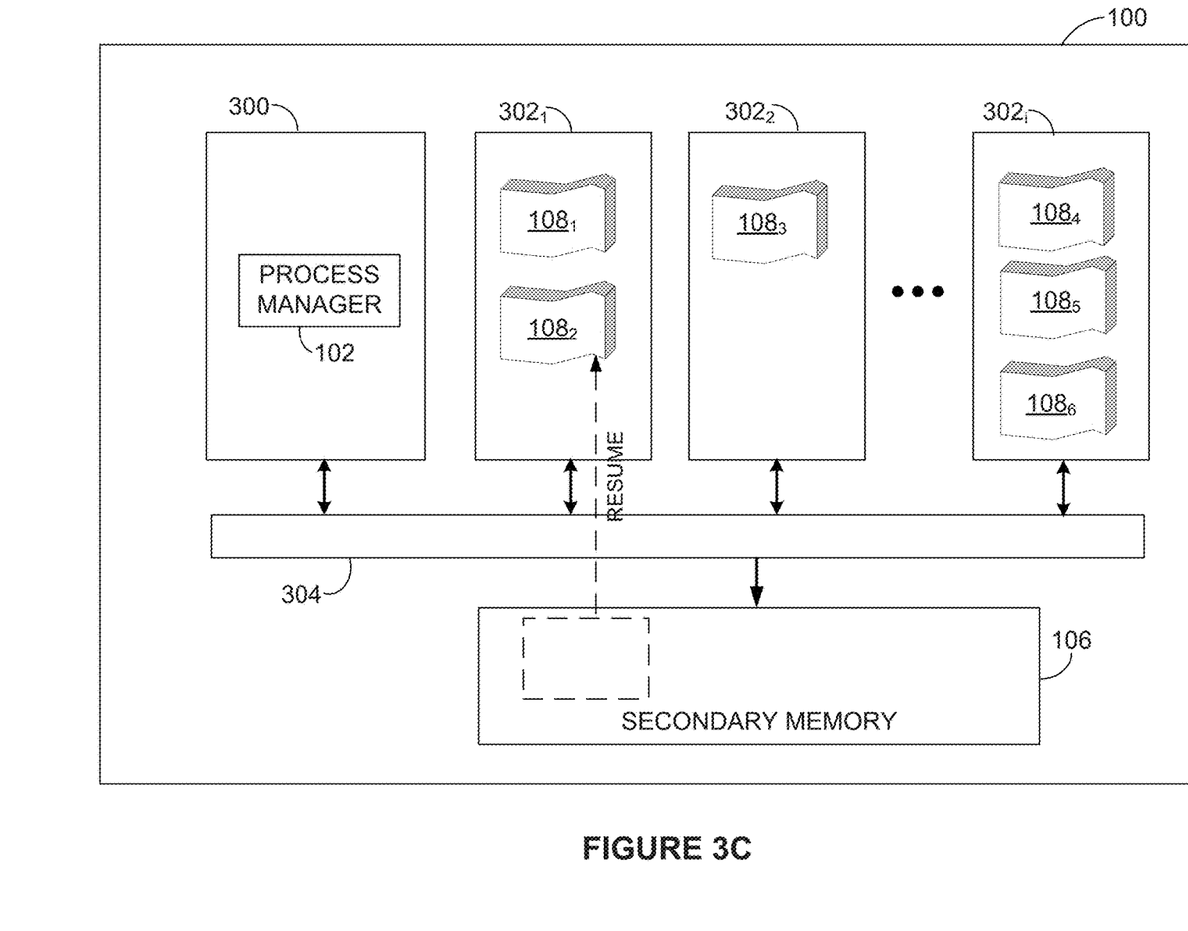
FIG. 3C is a schematic diagram of the computing device of FIG. 3A with a resumed process.

At FIG. 3C, the process manager 102 has, in response to a command to resume the process $108_2$, resumed process $108_2$ in container $302_1$. As was the case for the example illustrated in FIGS. 1A to 1D, a process 108 in secondary memory 106 may be resumed before or after another process in secondary memory 106 independently of the order in which the processes were hibernated.

Figure 4:
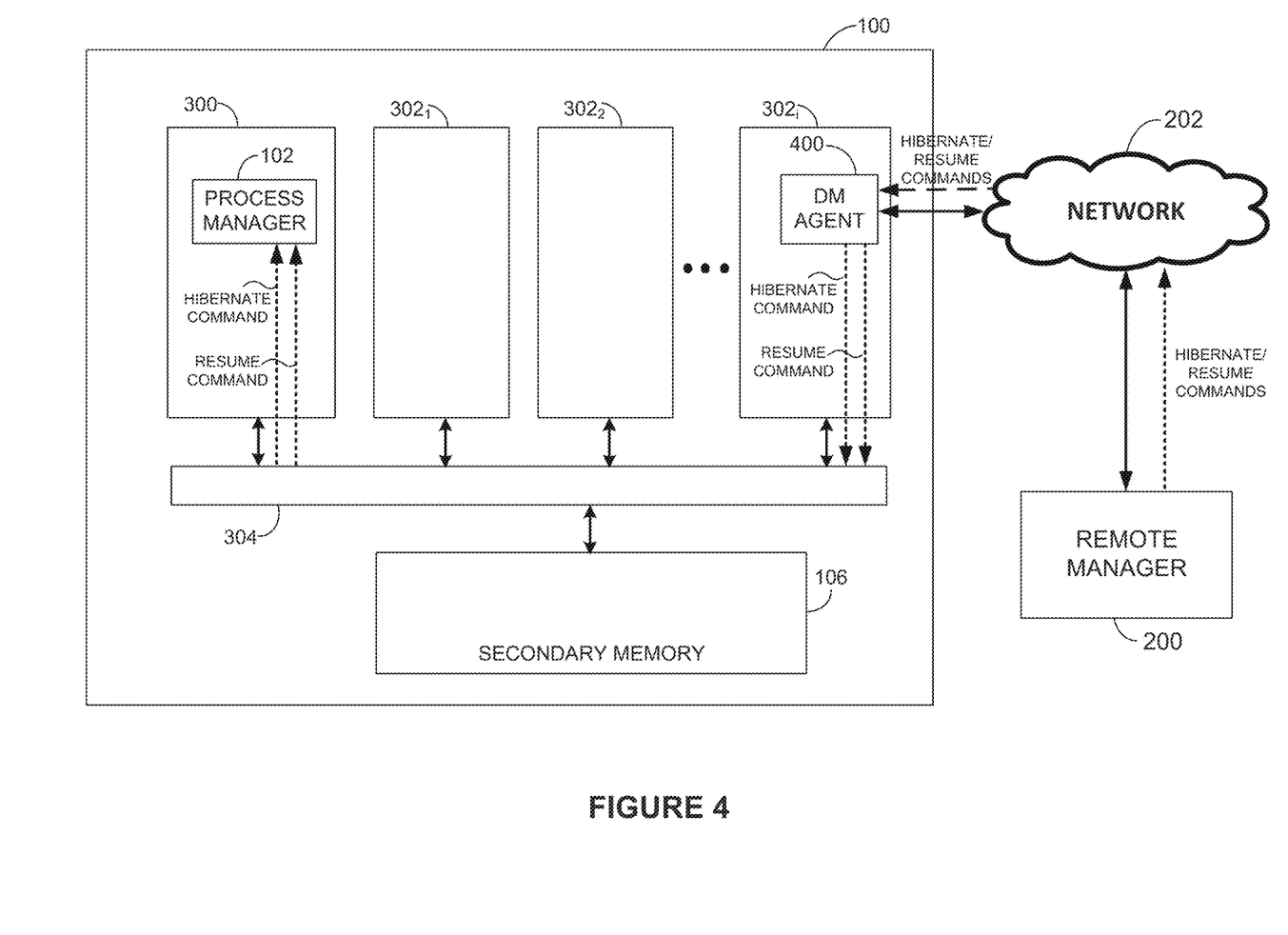
FIG. 4 is a schematic diagram of the computing device of FIG. 3A remotely accessed for process hibernation.

FIG. 4 illustrates an example embodiment of the computing device 100 comprising the root container 300 and additional containers $302_1$, $302_2$, ..., $302_i$, in communication with the remote manager 200 via the network 202. The remote manager 200 issues a hibernation command to a DM agent 400 running in container $302_i$. Although not illustrated, a separate DM agent may be provided in each additional container $302_1$, $302_2$. The DM agent 400 forwards the hibernation command to the process manager 102 in the root container 300 via the kernel 304. The process manager 102 performs hibernation and stores the hibernated process in the secondary memory 106. The remote manager 200 issues a resume command through the network 202 to the DM agent 400. The resume command is forwarded to the process manager 102 in the root container 300 via the kernel 304. The process manager 102 reads the saved hibernated process from the secondary storage and performs the resumption. In some embodiments, resumption is triggered from within the computing device 100 and the process manager 102 advises the remote manager 200 via the DM agent 400 and the network 202 that a process has been resumed.

In some embodiments, the computing device 100 is a multi-user device. Each user has a separate user account, and processes that run on the device 100 are each associated with one or more user accounts. Process hibernation may be used to hibernate processes associated with inactive user accounts to secondary memory 106, and restore the processes when the user accounts are activated.

In some embodiments, the computing device 100 comprises multiple operating systems, and processes that run on the device 100 are each associated with one or more of the operating systems. Process hibernation may be used to hibernate processes associated with inactive operating systems to secondary memory 106, and restore the processes when the operating systems are activated.

Figure 5:
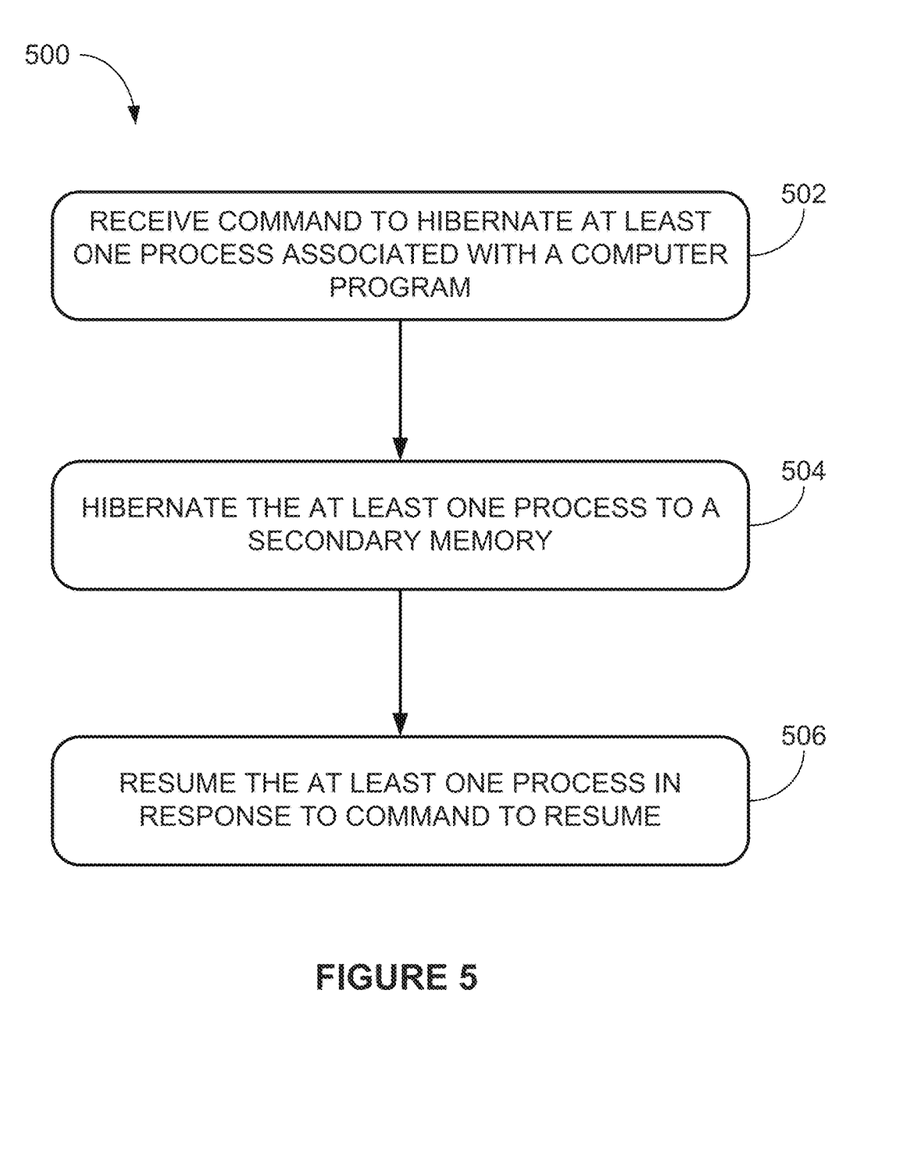
FIG. 5 is a flowchart of an example method for managing a computing device.

Referring now to FIG. 5, there is illustrated a method 500 for managing a computing device, such as computing device 100. At 502, a command to hibernate at least one process associated with a computer program on the computing device is received. At 504, the at least one process is hibernated to a secondary memory. The computing device remains operable during hibernation of the at least one process. At 506, the at least one process is resumed in response to a command to resume the at least one process.

Figure 6:
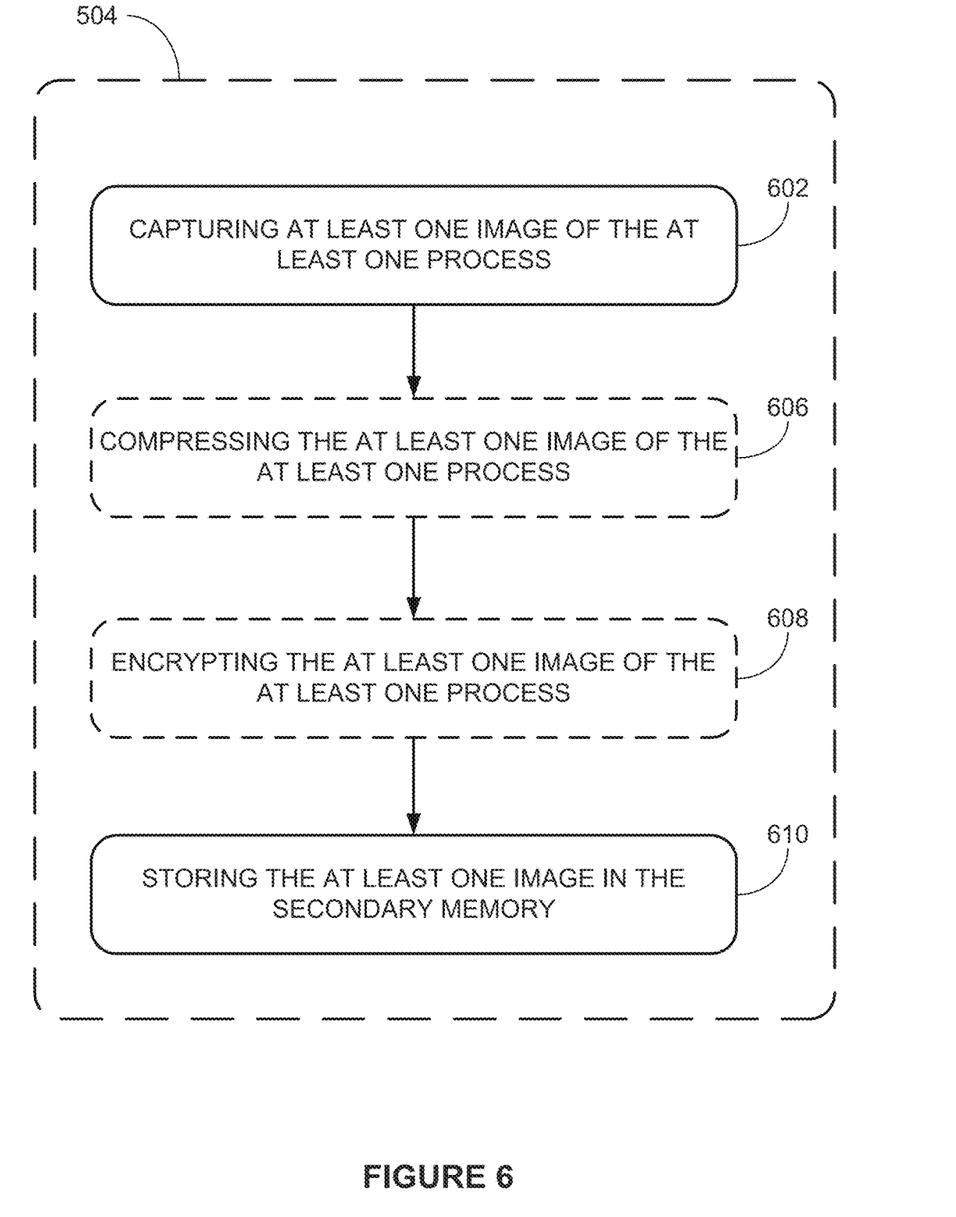
FIG. 6 is a flowchart of an example embodiment for hibernating at least one process.

FIG. 6 is a flowchart of an example embodiment of step 504 of method 500. At 602, at least one image of the at least one process is captured. For example, a capture service in Linux attaches itself to a process and obtains the process context, such as pages, signal handlers, registers, and file handlers, from the proper location in memory. At 610, the at least one image is stored in the secondary memory.

In some embodiments, hibernating the at least one process optionally comprises compressing the at least one image of the at least one process, as per 606. Indeed, compression allows for further optimization of the image in order to reduce the space occupied by the image in secondary memory. In some embodiments, hibernating the at least one process optionally comprises encrypting the at least one image of the at least one process, as per 608. Encryption prevents malicious applications from accessing the images as they are stored in secondary memory.

Figure 7:
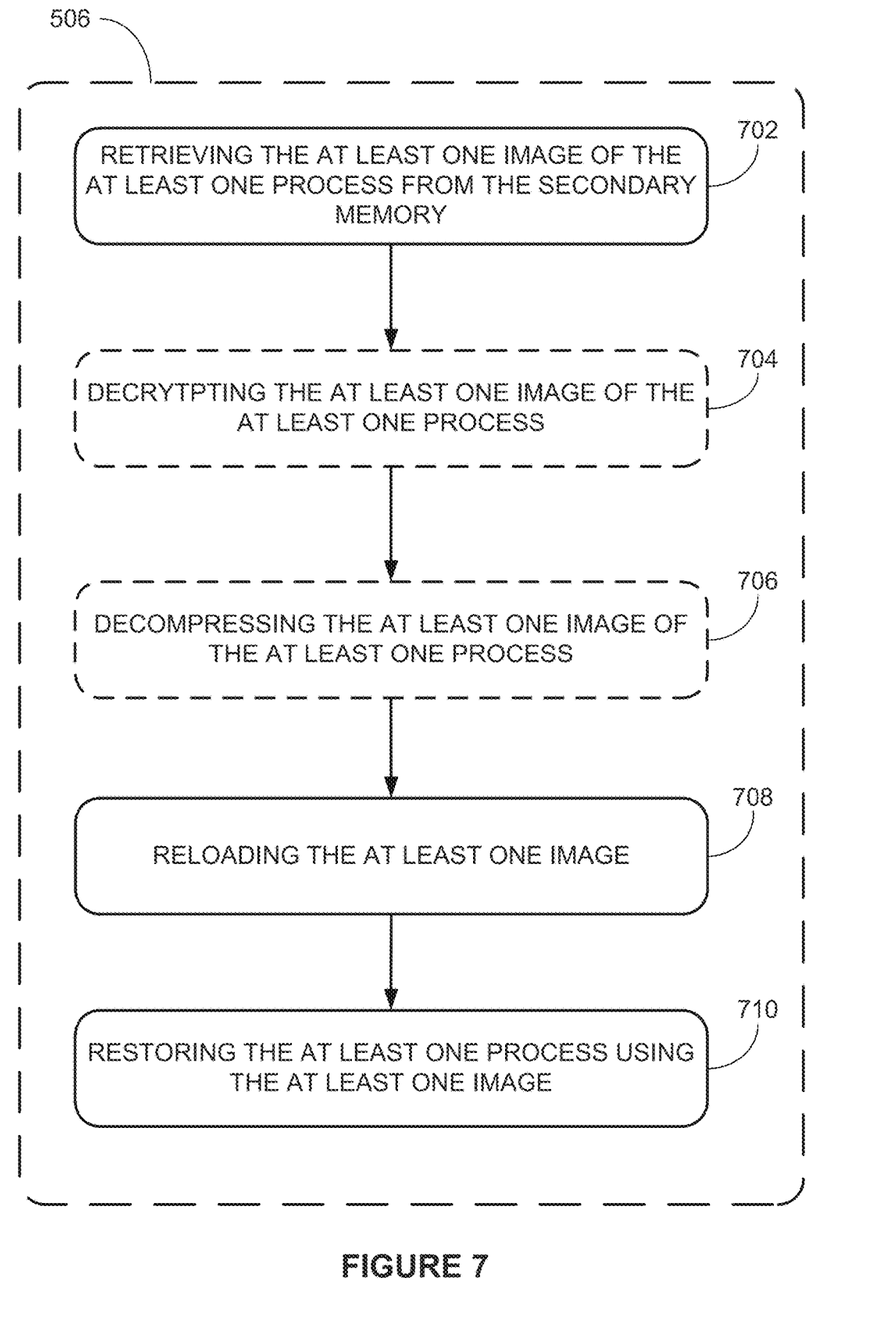
FIG. 7 is a flowchart of an example embodiment for resuming at least one process.

FIG. 7 is a flowchart of an example embodiment of step 506 of method 500. At 702, the at least one image previously stored in secondary memory is retrieved. At 708, the at least one image is reloaded into the primary memory. For example, a reload service in Linux loads the at least one image. At 710, the at least one process is restored using the at least one image.

When the image of the process has been compressed in step 606, the retrieved image is decompressed in step 706. When the image of the process has been encrypted in step 608, the retrieved image is decrypted in step 704.

In some embodiments, the secondary memory is removable from the computing device 100, thus allowing hibernated processes to be restored to another device. For example, the secondary memory is an SD card that may be removed from a first laptop and inserted into a second laptop.

When used in a BYOD or COPE environment, an administrator may also restore certain processes hibernating in one device to another device by remotely accessing the secondary memory and retrieving images of the hibernating processes.

Process hibernation may be used in conjunction with sleep mode. Sleep mode is a power saving state where all actions on the computing device are stopped and all processes are stored in memory while the computing device goes into a low-power state. The computing device boots quickly from sleep mode, but is inoperative while in sleep mode. In contrast, the process hibernation described herein performs selective hibernation of unnecessary and/or idle processes to a secondary memory while the computing device is still in use. Restoring a process image is performed more quickly than initializing a process, as is typically done when a new process is begun.

Figure 8:
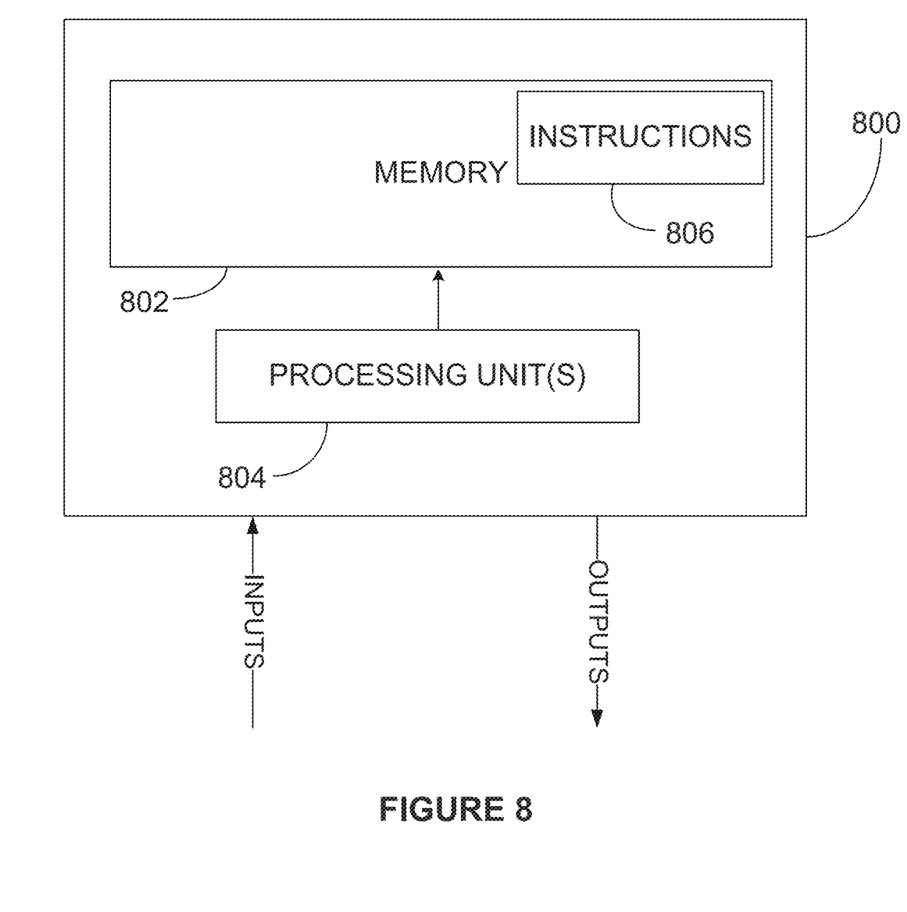
FIG. 8 is a block diagram of an example system for managing a computing device.

With reference to FIG. 8, the method 500 may be implemented by a system 800 for managing a computing device. The system 800 comprises at least one processing unit 804 and a non-transitory memory 802 which has stored therein computer-executable instructions 806. The processing unit 804 may comprise any suitable devices configured to cause a series of steps to be performed so as to implement the method 500 such that instructions 806, when executed by the system 800 or other programmable apparatus, may cause the functions/acts/steps specified in the methods described herein to be executed. The system 800 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 802 may correspond to primary memory 104 described above, or may be a separate memory and comprise any suitable known or other machine-readable storage medium. The memory 802 may comprise non-transitory computer readable storage medium, for example, but not limited to, an electronic, magnetic, optical, electromagnetic, infrared, or semiconductor system, apparatus, or device, or any suitable combination of the foregoing. The memory 802 may include a suitable combination of any type of computer memory that is located either internally or externally to system 800, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 802 may comprise any storage means (e.g., devices) suitable for retrievably storing machine-readable instructions 806 executable by processing unit 804.

The system, device and/or method described herein may be implemented in a high level procedural or object oriented programming or scripting language, or a combination thereof, to communicate with or assist in the operation of a computer system. Alternatively, the system, device and/or method may be implemented in assembly or machine language. The language may be a compiled or interpreted language. Program code for implementing the system, device and/or method may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Various aspects of the system, device and/or method may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The appended claims are to encompass within their scope all such changes and modifications.

The invention claimed is:

1. A method for managing a computing device, the method comprising:
   receiving a command to hibernate at least one process of a plurality of processes, the plurality of processes stored in a primary memory, each of the plurality of processes associated with a computer program, the computing device comprising a plurality of containers configured for running the plurality of processes, the at least one process running in one of the plurality of containers;
   hibernating the at least one process to a secondary memory when the one of the plurality of containers is inactive, the computing device remaining operable during hibernation of the at least one process; and
   resuming the at least one process in response to a command to resume the at least one process.

2. The method of claim 1, wherein hibernating the at least one process comprises:
   capturing at least one image of the at least one process; and
   storing the at least one image in the secondary memory.

3. The method of claim 2, wherein resuming the at least one process comprises:
   retrieving the at least one image from the secondary memory;
   reloading the at least one image; and
   restoring the at least one process using the at least one image.

4. The method of claim 2, wherein hibernating the at least one process comprises compressing the at least one image and storing the at least one image as compressed in the secondary memory.

5. The method of claim 2, wherein hibernating the at least one process comprises encrypting the at least one image and storing the at least one image as encrypted in the secondary memory.

6. The method of claim 1, wherein receiving the command to hibernate comprises receiving the command from a server remote to the computing device.

7. The method of claim 1, wherein the computing device comprises a plurality of operating systems, wherein the at least one process is associated with one of the plurality of operating systems, and wherein the one of the plurality of operating systems is inactive.

8. The method of claim 1, wherein the computing device comprises a plurality of user accounts, wherein the at least one process is associated with one of the plurality of user accounts, and wherein the one of the plurality of user accounts is inactive.

9. The method of claim 1, wherein the primary memory is a volatile memory and the secondary memory is a non-volatile memory.

10. A system for managing a computing device, the system comprising:
- at least one processing unit; and
- a non-transitory memory communicatively coupled to the at least one processing unit and comprising computer-readable program instructions executable by the at least one processing unit for:
  - receiving a command to hibernate at least one process of a plurality of processes, the plurality of processes stored in a primary memory, each of the plurality of processes associated with a computer program, the computing device comprising a plurality of containers configured for running the plurality of processes, the at least one process running in one of the plurality of containers;
  - hibernating the at least one process to a secondary memory when the one of the plurality of containers is inactive, the computing device remaining operable during hibernation of the at least one process; and
  - resuming the at least one process in response to a command to resume the at least one process.

11. The system of claim 10, wherein hibernating the at least one process to a secondary memory comprises:
- capturing at least one image of the at least one process; and
- storing the at least one image in the secondary memory.

12. The system of claim 11, wherein resuming the at least one process comprises:
- retrieving the at least one image from the secondary memory;
- reloading the at least one image; and
- restoring the at least one process using the at least one image.

13. The system of claim 11, wherein hibernating the at least one process comprises compressing the at least one image and storing the at least one image as compressed in the secondary memory.

14. The system of claim 11, wherein hibernating the at least one process comprises encrypting the at least one image and storing the at least one image as encrypted in the secondary memory.

15. The system of claim 10, wherein receiving the command to hibernate comprises receiving the command from a server remote to the computing device.

16. The system of claim 10, wherein the primary memory is a volatile memory and the secondary memory is a non-volatile memory.

17. A computing device comprising:
- a primary memory having stored thereon a plurality of processes, each of the plurality of processes associated with a computer program;
- a plurality of containers configured for running the plurality of processes;
- a secondary memory; and
- a process manager configured for:
  - receiving a command to hibernate at least one process of the plurality of processes, the at least one process running in one of the plurality of containers;
  - hibernating the at least one process to the secondary memory when the one of the plurality of containers is inactive, the computing device remaining operable during hibernation; and
  - resuming the at least one process in response to a command to resume the at least one of the one or more process.

18. The computing device of claim 17, wherein the computing device is a mobile device.

19. The computing device of claim 17, wherein the computing device comprises a plurality of operating systems, wherein the at least one process is associated with one of the plurality of operating systems, and wherein the one of the plurality of operating systems is inactive.

20. The computing device of claim 17, wherein the computing device comprises a plurality of user accounts, wherein the at least one process is associated with one of the plurality of user accounts, and wherein the one of the plurality of user accounts is inactive.

21. The computing device of claim 15, wherein the primary memory is a volatile memory and the secondary memory is a non-volatile memory.

* * * * *